United States Patent
Islam et al.

(10) Patent No.: US 12,016,030 B2
(45) Date of Patent: Jun. 18, 2024

(54) DOWNLINK CONTROL CHANNEL SIGNALING FOR UPLINK COEXISTANCE OF MULTIPLE SERVICE TYPES

(71) Applicant: Apple Inc., Cupertino, CA (US)

(72) Inventors: Toufiqul Islam, Santa Clara, CA (US); Fatemeh Hamidi-Sepehr, Santa Clara, CA (US); Debdeep Chatterjee, San Jose, CA (US); Sergey Panteleev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 519 days.

(21) Appl. No.: 17/267,114

(22) PCT Filed: Aug. 8, 2019

(86) PCT No.: PCT/US2019/045672
§ 371 (c)(1),
(2) Date: Feb. 9, 2021

(87) PCT Pub. No.: WO2020/033660
PCT Pub. Date: Feb. 13, 2020

(65) Prior Publication Data
US 2021/0168783 A1 Jun. 3, 2021

Related U.S. Application Data

(60) Provisional application No. 62/828,383, filed on Apr. 2, 2019, provisional application No. 62/739,073, filed
(Continued)

(51) Int. Cl.
*H04W 72/23* (2023.01)
*H04L 1/1812* (2023.01)
(Continued)

(52) U.S. Cl.
CPC .......... *H04W 72/23* (2023.01); *H04L 1/1812* (2013.01); *H04W 72/1268* (2013.01); *H04W 72/56* (2023.01)

(58) Field of Classification Search
CPC ............................. H04W 72/23; H04W 72/21
See application file for complete search history.

(56) References Cited

U.S. PATENT DOCUMENTS

2009/0197630 A1 8/2009 Ahn et al.
2009/0325625 A1 12/2009 Hugl et al.
(Continued)

FOREIGN PATENT DOCUMENTS

WO 2018093162 A1 5/2018

OTHER PUBLICATIONS

Technical Specification; 3GPP TS 38.331 V15.2.1; 3rd Generation Partnership Project; Technical Specification Group Radio Access Network; NR; Radio Resource Control (RRC) Protocol Specification; Release 15; Jun. 2018; p. 1-303.
(Continued)

*Primary Examiner* — Sulaiman Nooristany
(74) *Attorney, Agent, or Firm* — Eschweiler & Potashnik, LLC

(57) ABSTRACT

Systems, apparatuses, methods, and computer-readable media are provided for causing a user equipment (UE) device to receive a configuration signaling to monitor for uplink (UL) cancellation indications; monitor a search space for an UL cancellation indication; detect an UL cancellation indication in the search space; and in response, cancel at least a portion of a scheduled UL transmission.

20 Claims, 2 Drawing Sheets

Related U.S. Application Data on Sep. 28, 2018, provisional application No. 62/717,668, filed on Aug. 10, 2018.

(51) Int. Cl.
*H04W 72/1268* (2023.01)
*H04W 72/56* (2023.01)

(56) References Cited

U.S. PATENT DOCUMENTS

| | | | |
|---|---|---|---|
| 2015/0334762 | A1 | 11/2015 | Yang |
| 2016/0323831 | A1 | 11/2016 | Ahn et al. |
| 2018/0070341 | A1* | 3/2018 | Islam .................... H04L 5/0064 |
| 2020/0344747 | A1* | 10/2020 | Park ...................... H04W 72/21 |

OTHER PUBLICATIONS

Technical Specification; 3GPP TS 38.321 V15.2.0; 3rd Generation Partnership Project; Technical Specification Group Radio Access Network; NR; Medium Access Control (MAC) Protocol Specification; Release 15; Jun. 2018; p. 1-73.

Technical Specification; 3GPP TS 38.212 V15.2.0; 3rd Generation Partnership Project; Technical Specification Group Radio Access Network; NR; Multiplexing and Channel Coding; Release 15; Jun. 2018; p. 1-94.

Technical Specification; 3GPP TS 38.213 V15.2.0; 3rd Generation Partnership Project; Technical Specification Group Radio Access Network; NR; Physical Layer Procedures for Control; Release 15; Jun. 2018; p. 1-98.

International Search Report dated Nov. 22, 2019 for International Application No. PCT/US2019/045672.

"Discussion on UL pre-emption for URLLC reliability." Source: Potevio. Agenda Item: 7.2.2. 3GPP TSG RAN WG1 Meeting #93, Busan, Korea, May 21-25, 2018. R1-1807228.

"UL multiplexing for URLLC." Source: China Telecom. Agenda Item: 7.2.6.2. 3GPP TSG RAN WG1 Meeting #94, Gothenburg, Sweden, Aug. 20-24, 2018. R1-1808306.

International Preliminary Report on Patentability dated Feb. 16, 2021 for International Application No. PCT/US2019/045672.

Vivo; "Summary of 7.3.3.6 multiplexing data with different transmission durations"; 3GPP TSG RAN WG1 Meeting AH 1801; R1-1801155; Jan. 22, 2018.

Fujitsu; "On eMMB and URLL Multiplexing"; 3GPP TSG RAN WG1 Meeting #91; R1-1719616; Nov. 27, 2017.

* cited by examiner

DOWNLINK CONTROL CHANNEL SIGNALING FOR UPLINK COEXISTANCE OF MULTIPLE SERVICE TYPES

CROSS REFERENCE TO RELATED APPLICATIONS

This application is a National Phase entry application of International Patent Application No. PCT/US2019/045672 filed on Aug. 8, 2019, which claims priority to U.S. Provisional Patent Application No. 62/717,668 filed on Aug. 10, 2018, entitled "DOWNLINK CONTROL CHANNEL SIGNALING FOR UL COEXISTANCE OF MULTIPLE SERVICE TYPES", U.S. Provisional Patent Application No. 62/739,073 filed on Sep. 28, 2018, entitled "DOWNLINK CONTROL CHANNEL SIGNALING FOR UL COEXISTANCE OF MULTIPLE SERVICE TYPES", and U.S. Provisional Patent Application No. 62/828,383 filed on Apr. 2, 2019, entitled "SYSTEM AND METHOD OF DOWNLINK CONTROL CHANNEL SIGNALING FOR UL COEXISTANCE OF MULTIPLE SERVICE TYPES", and is hereby incorporated by reference in its entirety.

BACKGROUND

Various examples generally may relate to the field of wireless communications.

DETAILED DESCRIPTION

Figure 1:
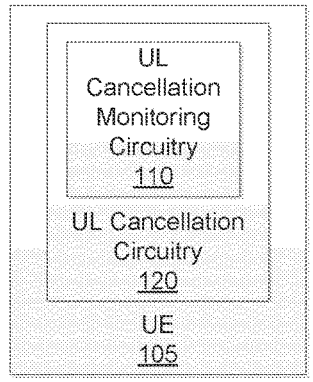
FIG. 1 depicts an exemplary user equipment device including cancellation circuitry in accordance with some examples.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various examples. However, it will be apparent to those skilled in the art having the benefit of the present disclosure that the various aspects of the various examples may be practiced in other examples that depart from these specific details. In certain instances, descriptions of well-known devices, circuits, and methods are omitted so as not to obscure the description of the various examples with unnecessary detail. For the purposes of the present document, the phrase "A or B" means (A), (B), or (A and B).

NR systems are to support coexistence of diverse services and traffic communication in a common carrier. As different services have different requirements and characteristics, multiplexing techniques need to be studied so that transmission of packets of each service type is minimally impacted.

The present disclosure is related to UL multiplexing of transmissions with different reliability and/or latency requirements. In particular, how one or more indication of impacted resources can be conveyed to one or more UEs so that ongoing or imminent UL transmission can be adjusted in order to avoid adversely impacting other UL transmission that may occur in shared resources. Transmission of one service type may be more urgent than the other, and may be prioritized over other ongoing transmissions.

Examples herein provide several UE-specific indication mechanisms so that one or more UL transmissions can be made in shared resources, either orthogonal or non-orthogonal manner. Orthogonal transmission refers to the case, when multiple transmissions are made in overlapping time-frequency-code resources. By non-orthogonal transmission, it is assumed that at least one of time resource, frequency resource, code can be overlapping or common between multiple transmissions.

Examples include UE-specific control channel signaling, in particular DCI format content design and configurations, to convey UL transmission cancellation indication to a UE. Examples also include mechanisms for triggering a UE with a power control parameter as function of active BW part. Examples also include using a configured RNTI for UL grant where one or more transmission parameters can be implicitly obtained based on the RNTI detected.

Unless mentioned otherwise, durations mentioned below can be one or more slots, one or more symbols, or a combination thereof. UL coexistence may occur in licensed and unlicensed band either below or above 6 GHz, FDD and TDD systems, and in any bandwidth part of a given numerology, such as 15 kHz, 30 kHz, 60 kHz, 120 kHz etc. Note that UL transmission cancellation indication can be alternatively called UL transmission interruption indication or UL transmission preemption indication. CORESET refers to DL control resource set which may comprise a group of contiguous/non-contiguous PRBs and a group of symbols, and CORESET comprises one or more search spaces where DL control channel signaling, such as UL transmission cancellation indication or UL grant, can be monitored/detected.

Although in the examples, UE specific indication is used, similar PDCCH monitoring behaviors, search space set configuration can be used for group-common indication as well. For example, UL cancellation indication can be group-common indication, in a DCI e.g., in a PDCCH, or using a sequence.

Indication of UL Transmission Cancellation

FIG. 1 illustrates an example UE 105 that includes cancellation circuitry 110 and monitoring circuitry 120. The cancellation circuitry 110 is configured to cancel a scheduled UL transmission in response to an UL cancellation indication as will be described below. The monitoring circuitry 120 is configured to monitor for cancellation indications in specific search spaces as will be described below.

UE may not need to monitor for any UL cancellation indication before receiving an UL grant for PUSCH transmission. UE may be configured to monitor for one or more UL grant cancellation indications upon successful detection of an UL grant. Below, examples are provided for activation, configuration, and content design of such transmission cancellation indication. Examples below are provided in the context of PUSCH transmission cancellation. However, similar considerations can be made, for other ongoing or imminent UL transmissions, such as PUCCH, PRACH, and SRS, after the UE is triggered for such transmission, either semi-statically or dynamically or by a combination of such signaling.

Activation of Monitoring UL Cancellation Indication

In one example, UE is configured by RRC signaling to monitor for UL transmission cancellation indication (UL_CI). In particular, a higher layer parameter UL_CI=ON or OFF can be used to activate monitoring of UL preemption or cancellation indication after UE receives the grant (e.g., successful decoding of the DCI). If the cancellation indication is used for other UL transmissions such as PUCCH, PRACH, and SRS, then UE can monitor for UL_CI at configured locations after higher layer parameter triggers activation of monitoring, e.g., UL_CI=ON. The higher layer parameter that provides the trigger that CI may need to be monitored can be obtained via one or more of configuration of UL BW part where PUSCH transmission is made, configuration of DL BW part where PDCCH transmission carrying UL_CI is made, PUSCH configuration of a given UE, common PUSCH configuration in a component carrier. Such characterization may require considerations regarding the UE processing time (i.e., DCI decoding time), e.g., N2 being the number of OFDM symbols required for UE processing from the end of PDCCH containing the UL grant to the earliest possible start of the corresponding PUSCH transmission from UE perspective. In another example, UL grant in a PDCCH may contain a field to trigger monitoring for UL transmission cancellation indication(s). In particular, a bit-field in PDCCH containing UL grant can be 1 or 0 (or vice versa) to indicate the UE to monitor for UL PI or not monitor, respectively. PI i.e., preemption indication is interchangeably used for CI in the disclosure.

Monitoring of Cancellation Indication

At the first phase, UE receives UL grant. In the second phase, UE monitors for one or more UL_CIs. In this example, monitoring UL_CI(s) is triggered following indication of a grant of PUSCH. UL_CI can be received in a UE specific DCI in a PDCCH or just in a UE specific PDCCH.

Figure 2:
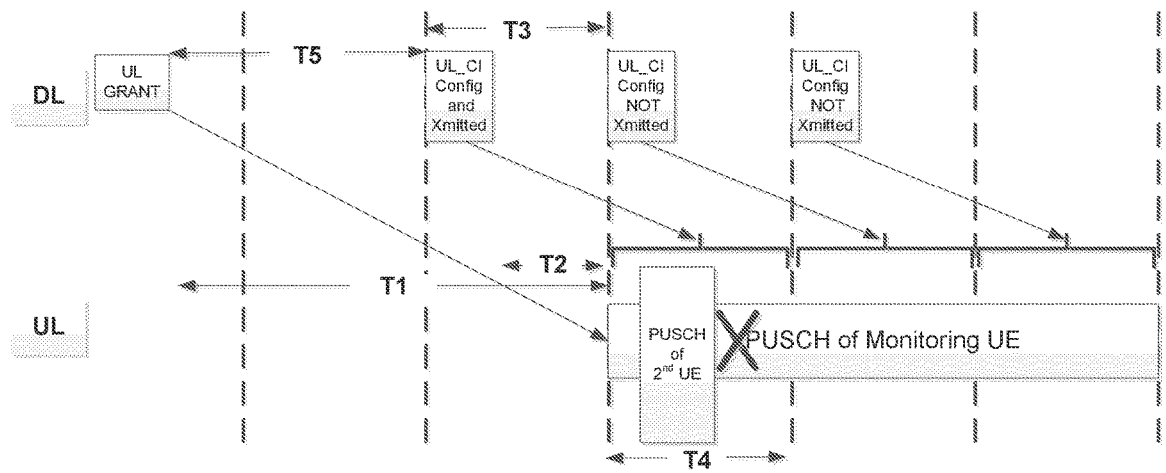
FIG. 2 depicts an exemplary timeline for UL cancellation in accordance with some examples.

In one example, monitoring for UL_CI(s) may be performed over a window following UL grant. The window may comprise M≥1 monitoring occasions for the UL_CI(s). The position of first occasion can be obtained as an offset from where UL grant was received. A parameter T5 can be identified, which can be measured in symbol(s) or slot(s) or a combination for a given numerology, which indicates the location of first monitoring occasion of UL_CI(s), as an offset from a known reference point which can be beginning or end of CORESET where UL grant was detected or from the boundary of the slot where UL grant was detected. In FIG. 2, the parameter T5 is measured from the end of CORESET where UL grant was received to the beginning of CORESET where first UL_CI is monitored. In one example, T5 can be indicated as (number of slot(s)−1)*$N_{symb}$+starting symbol in a slot, where the number of slot(s) is counted from where UL grant was received and starting symbol is where first symbol of CORESET for monitoring UL_CI is located. One or more parameters related to the indication of T5, such as number of slots offset from where UL grant was detected or starting/first symbols of CORESET where first UL_CI is monitored, can be included in UL grant and/or higher layer configured. $Ns_ymb$ here denotes the number of symbols in slot of a given numerology and may be 14 for the case of NCP and 12 for the case of ECP.

In one example, the UL_CI(s) are monitored with a periodicity after first monitoring occasion of UL_CI. The periodicity can be configured as part of the configuration of search space where UL_CI is monitored. A parameter T3 can be identified which can be used as monitoring period for monitoring successive occasions of UL_CI(s). T3 can be measured in symbol(s) or slot(s) or a combination thereof for a given numerology. Parameter T3 can be higher-layer configured, or can be implicitly obtained based on the time gap between the end of the UL grant and the end of the scheduled PUSCH or duration of PUSCH scheduled.

In another example, the parameter M can be higher-layer configured or can be derived implicitly from the time gap between the end of the UL grant and the end of the scheduled PUSCH or from the duration of PUSCH scheduled.

The UE that may receive UL_CI may be indicated a longer transmission duration for PUSCH. For example, UEs that receive transmission with a specific PUSCH mapping type, e.g., mapping type A in specifications, where starting symbol is symbol index 0 in a slot and length of PUSCH is at least 4 symbols up to 14 symbols. More generally, if configured e.g., by higher layer signaling, UEs with PUSCH duration longer than J symbols may monitor UL_CI(s) following UL grant, where J can be an integer, J={2, 3, 4, 5, 6, 7, 8, 9, 10, 12, 13, 14}. In one example, time-partitioning of the PUSCH duration can be obtained (e.g., L≥1 time parts) and one UL_CI may address one time partition of the PUSCH. UL_CI addressing a time partition may indicate all of the scheduled resource within the time partition to be cancelled or a portion of it. In one example, each time partition can be further divided in frequency, e.g., J≥1 frequency parts, i.e., the PUSCH BW can be divided into J parts for each time partition. The frequency parts can be counted from top or bottom of PUSCH BW. Each UL_CI if detected notifies the UE of cancellation of all or part of the time part.

In FIG. 2, UE receives an UL grant which indicates that PUSCH is to start after time T1 from where UL grant was received. In the figure, T1 is measured from the end of CORESET where UL grant is detected to the beginning of PUSCH. Alternatively, T1 can be measured as (number of slot(s)−1)*$N_{symb}$+starting symbol in a slot, where the number of slot(s) is counted from where UL grant was received and starting symbol is the first symbol of PUSCH. For the latter example, number of slot(s) offset and/or starting symbol of PUSCH can be dynamically indicated in UL grant or higher layer configured. If configured or indicated, UE starts monitoring for UL_CI after T5 duration following detection of UL grant. PUSCH duration is divided into L=3 parts. UE monitors UL_CI at M=L=3 occasions. The periodicity of monitoring UL_CI is T3. The application time after detecting UL_CI is identified to be T2. T2 can be same, larger or smaller than UE processing capability N1 or N2 identified in the R15 specifications. In the considered example, UL_CI is detected in the first occasion which triggers the UE to cancel transmission in the first time of the allocated resource of PUSCH. UL_CIs are not transmitted in following occasions meaning that UE can continue transmission of PUSCH in remaining time parts. In one example, UE also drops the remaining parts of the PUSCH, i.e., once UL_CI is received, UE drops PUSCH starting from the impacted area indicated by UL_CI.

In one example, duration of each time part T4 may or may not be equal to monitoring period T3.

In one example, parameter T5 can be implicitly obtained from parameter T1 or one or more parameters defining T1, such as number of slot(s) offset from the slot where UL grant is received (this is identified as K2 value in specifications). In one example, each of the parameters T1, T2, T3, T5 can be same or larger than the minimum UE processing time for PUSCH preparation procedures, i.e., can be subject to UE capability.

In one example, UL_CI(s) can be monitored in UE specific or group-common search spaces associated with one or more CORESETs. Monitoring periodicity, monitoring offset of UL_CI(s) etc. can be configured as part of one or more search spaces associated with one or more CORESETs in a given DL BWP. However, monitoring is active only when UE has an imminent or ongoing UL transmission. UL_CI(s) may be monitored with K=>1 aggregation levels. In one example, as part of higher layer parameter searchspace-config, UE can be configured the following for UL_CI(s):

- Association of the DCI format with the search space, based on whether it is UE specific search space or common search space. If UE specific search space, higher layer parameter USS-DCI-Format indicates to monitor PDCCH for a given DCI format that contains UL_CI(s). If common search space is used, higher layer parameter RNTI-monitoring may indicate to monitor PDCCH with the RNTI used for DCI format that contains UL_CI(s).
- Number of PDCCH candidates according to the supported aggregation levels
- PDCCH monitoring periodicity, in symbols or slots, or a combination thereof (e.g., T3)
- PDCCH monitoring offset, in symbols or slots, or a combination thereof (e.g., T5 or number of slots in calculation of T5, see example mentioned above for calculation of T5)
- PDCCH monitoring pattern within a slot, e.g., location of first symbol of CORESET within a slot for monitoring (e.g., maybe used to identify starting symbol of CORESET in calculation of T5, cf. examples mentioned above for calculation of T5)

Note that monitoring of UL_CI(s) is triggered based on events, such as if UE receives an UL grant. Hence, although monitoring configuration, in one example, can be obtained as part of search space configuration associated with one or more CORESET(s) in a DL BWP, UE does not actively monitor based on the parameters always. For example, PDCCH monitoring offset in the configuration for UL_CI may be separate from other PDCCH monitored in the search space. In the context of PDCCH monitoring offset may indicate time offset between reception of UL grant and beginning of CORESET where UL_CI is monitored, e.g., T5 in FIG. 2. In one example, offset only indicates number of slots from where UL grant is received and if the starting symbol(s) of the CORESET containing UL_CI is not symbol #0 in a slot, PDCCH monitoring pattern within a slot can be utilized to identify the location of first symbol of CORESET where to monitor UL_CI In one example, UE may monitor UL_CI in same or different CORESET than where it received UL grant that scheduled the transmission.

In one example, the scheduled PUSCH duration may comprise one or more repetitions. An implicit way to trigger the UE to monitor for UL_CI is if repetition number K exceeds a given/configured value. For example if K is equal or larger than 2, UE may monitor for UL_CI.

The monitoring configurations discussed above are applicable to any DCI format that contains UL_CI.

DCI Format Examples

In one example, UE specific DCI scrambled by C-RNTI or another configured RNTI can be used for DCI format containing UL_CI(s). In one example, one or more reserved fields can be used in UL grant such as in DCI format 0_0 or 0_1, which can be used for UL_CI. For example, one bit field can be used, which if 1 (or vice versa), may indicate that a certain time-frequency portion or all of the PUSCH need to be cancelled by the UE. Hence, if that bit-field contains a given value that triggers cancellation, one or more of the rest of the fields in the DCI format may not be valid, e.g., such DCI format may not assign any resource allocation. For example, in the context of FIG. 2, for each of the L parts, UE monitors for the UL grant, whether the bit-value in the field indicates cancellation or not. There can be J parts of PUSCH configured in frequency to facilitate partial cancelation of PUSCH in frequency domain.

In another example, DCI format for UL_CI is scrambled with a different RNTI than used for UL grant. UE may monitor for UL grant or any other DCI format, such as a compact DCI format with the RNTI for one or more occasions. Hence, detection of an identified DCI format with the configured new RNTI indicates cancellation of part or all of the PUSCH scheduled by the original UL grant. In the context of FIG. 2, detection of DCI with the given RNTI indicates cancellation for first part, whereas for second and third time part, no DCI sent. The content of the DCI is not valid.

In one example, value of L and J are higher layer configured. In another example, value of J and L are implicitly derived from set or number of PRBs and number of symbols scheduled, respectively. A higher-layer configured table can be used for UE where UE can obtain values of J and/or L based on a range of values for number of PRBs and range of values for number of symbols, and example of which is shown by table 1.

TABLE 1

| Value of L | Range of PUSCH duration (symbols) |
|---|---|
| 1 | 1 to 4 |
| 2 | 5 to 8 |
| 3 | 9 to 12 or 14 |

In one example, value of L and J depend on numerology. UE may obtain the configuration for the values of L and J based on active BW part.

Figure 3:
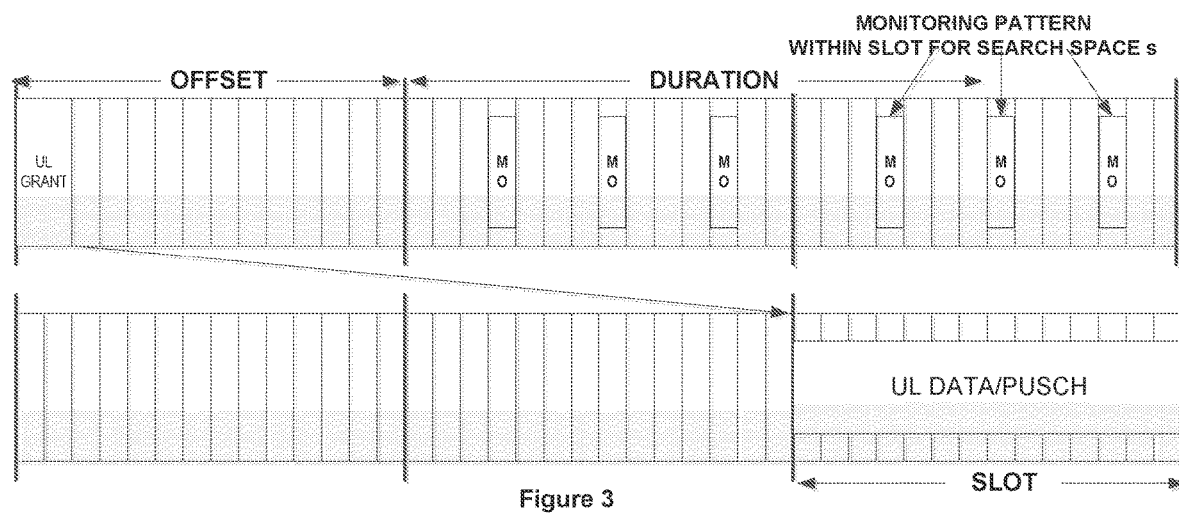
FIG. 3 depicts an exemplary search space with a pattern for monitoring for UL cancellation or rescheduling in accordance with some examples.

In one example, the DCI format for UL_CI may contain a bitmap of X*Y bits, where X≥1 indicates number of time partitions within each time part, Y≥1 indicates number of frequency parts. The time and frequency granularity can be higher layer configured or implicitly obtained from allocated resource of PUSCH. In FIG. 3, X=1 and Y=1 is assumed. X and Y can be configured or obtained in a numerology-specific manner, i.e, depend on active BW part.

In one example, a compact DCI format can be conceived for UL_CI. The compact DCI can be monitored with C-RNTI or any other configured RNTI. The compact DCI may indicate one or more of the follows:

- Header/flag if multiple DCI format have same size
- A field containing XY bits, to indicate which area to cancel transmission
   - May be bitmap comprising X*Y bits
- HARQ ID
   - In case, UE may have multiple UL transmission going in parallel
- Carrier indicator
- BWP indicator
- Zero padding etc.

In one example, one or more of the NDI bit field, HARQ ID bit field, MCS indication field, Time/frequency resource allocation field of UL grant, such as DCI format 0_0 or 0_1 can be used to identify the DCI is in fact indicating transmission cancellation, not a grant. For example, for a given HARQ ID, if NDI bit is toggled, it may refer new transmission. However, certain set of entries of MCS table are reserved for retransmission, e.g., MCS with indices 28-31. Now, one of those reserved entries for MCS can be indicated while NDI bit can be toggled for the same HARQ process ID, which may serve as notification of UL_CI for the packet scheduled with the HARQ process ID. The time/frequency resource allocation bit-fields can be used for indicating which time/frequency area to cancel transmission, and can span physical resources beyond the earlier allocated PUSCH. Accordingly, the UE may be expected to cancel all UL transmissions that overlap with the resource region identified by the resource allocation information in the UL_CI. In one example, if time/frequency resource allocation uses a total of $L \geq 1$ bits, then $K <= L$ bits can be used for cancellation indication. As further examples, either the time and frequency domain RA bit-fields could be combined and re-interpreted to determine the time-frequency resources for cancellation or the time and frequency domain RA fields be interpreted as for a regular UL grant.

Rescheduling/Revised grant for Same HARQ Process ID

In one example, new physical channel or DCI format design may not be necessary. First UL grant schedules a packet with a certain status of NDI bit for a given HARQ process. If the UE receives a subsequent UL grant for the same HARQ process (or transport block) with either same or different NDI bit status over a configured window or set of monitoring occasions, cf. monitoring configurations considered above, before or during the ongoing PUSCH transmission scheduled by first UL grant, UE may drop the ongoing transmission and instead follow the updated grant for the same HARQ process. This approach basically 'shifts' the PUSCH resource allocation, e.g, to a later time, or alternatively updates the UL grant with a new resource allocation. The updated grant can also be referred to as revised or rescheduling grant.

In the context of this example, a subsequent grant is performing both the operation of cancellation of transmission and scheduling a transmission. Further, if the UE has been configured with repeated transmissions by an earlier configuration, such subsequent grant can perform the role of repetition cancelation as well as scheduling a new transmission. UE can be configured to monitor for the subsequent UL grant at one or more occasions. If the subsequent grant is not received within the configured number of occasions, UE continues with existing operation or follow original grant. A configured number of occasions may be obtained by configuring a time window or duration that comprises the occasions.

Even though the network scheduler may transmit the original grant flexibly at any time, the transmission occasions of the revised grant and how frequent the network can send such revised grant, may not be the same as when the UE monitors for the first grant.

One important aspect is to avoid excessive delay in terms of the UL grant reception and UL transmission, which is particularly important for UEs supporting low latency traffic, while accounting for the required processing time by the UE to detect and take action on the revised UL grant.

Accordingly, in one extended example, the UE monitors for potential subsequent updated grant, possibly with a finer monitoring granularity, and within a time window, upon detection of an UL grant. Such monitoring periodicity as well as the time window duration can be configured or predefined, and may be obtained as a function of the original (prior to reception of the UL grant) monitoring occasion periodicity, symbols, slots, etc. Alternatively, the window length may be determined based on the scheduled PUSCH (or PUSCHs in case configured with repetitions) duration, e.g., the UE may or may not monitor after the PUSCH transmission (transmissions in case of repetitions) ends. As yet another alternative, the time window duration may be configured to the UE as part of search space set configuration via higher layers (UE-specific RRC signaling).

It is noted that if the network configures the UE with a fine monitoring granularity, e.g., without any change before and after the reception of the grant, the UE may be burdened with unnecessary frequent monitoring, e.g., when no rescheduling needs to be performed. This clarifies the need for a proper choice of the window length as well as the monitoring periodicity.

In another example, the UE may be configured with a monitoring periodicity for general scheduling transmission, as well as an additional set of DCI monitoring configuration parameters corresponding to the potential rescheduling operation. These additional configurations may be activated/triggered based on an event, e.g., reception of an UL grant, and may be associated with a particular search space set configuration.

The PDCCH monitoring periodicity, offset, and pattern within a slot are currently indicated as part of the configurations for a given search space set. The re-scheduling grant may then be monitored in a same or different search space set than the search space set in which the original grant was received, potentially with some additional parameters (such as different monitoring periodicity), e.g., based on a triggering event, when the UE is monitoring for a rescheduling grant.

For example, a given search space and CORESET may have two monitoring periodicities, one as the default monitoring periodicity, and the other one may only be triggered/activated if certain event(s), e.g., reception of a scheduling grant, happens. The additional set of parameters may include a different monitoring periodicity, offset or pattern relative to the original UL grant.

Currently, the monitoring related parameters and configurations are configured semi-statistically. In general, dynamic update of search space monitoring configuration may be considered in one realization of the present disclosure. In the particular example mentioned above, such dynamic update may not require any dynamic indication and can be activated/deactivated implicitly.

Such dynamic update of the configurations, may enable the cases where in some of monitoring occasions the UE monitors no candidate, while in some other occasions the UE monitors few additional candidates. In other words, with this additional monitoring settings, the UE may monitor more frequently but fewer candidates, e.g., a subset of the candidates it may monitor for a full-blown regular monitoring.

In one example, it is specified that such additional monitoring behavior, may only be triggered—upon detection of a valid UL grant scheduling data transmission in the UL.

The minimum PUSCH preparation time for the subsequent UL grant, considering the time required by the UE to detect and decode the revised grant as well as the time the UE requires to take action on it (e.g., cancellation of earlier grant and PUSCH preparation and transmission according to the revised grant), depends on the UE processing time capability, and the UE implementation, e.g., N2 defined as the number of OFDM symbols required for UE processing from the end of PDCCH containing the UL grant to the earliest possible start of the corresponding PUSCH transmission from UE perspective.

Activating additional UE monitoring upon reception of an UL grant, may also be extended for the case of UL updated grant for different HARQ process IDs. Accordingly, depending on the HARQ process, if the latter is a re-scheduling grant with NDI not being toggled compared to the first grant, the UE cancels transmission of the PUSCH corresponding previous grant.

In another example, the UE may continue to transmit PUSCH according to both grants for the same HARQ process, irrespective of the NDI toggling stage, as long as the PUSCHs are TDM-ed, i.e., there is no time-domain overlap between the resource allocations by the first and second grants. Accordingly, the UE follows the scheduling grants, and proceeds with the transmissions where each grant follows its own HARQ timeline.

Search Space Set Configuration

As indicated above, one aspect of updated/rescheduling grant is dynamic adaptation in UE monitoring behavior. Below, a few examples on how to achieve dynamic PDCCH monitoring are discussed, where the monitored PDCCH may alter/update/cancel resource assignment by a previous PDCCH. For the examples, it is assumed that UE is configured with S search space sets in a given DL BWP, where search space set is indexed by s. UL cancellation indication UL_CI or updated grant/rescheduling grant can be configured to be transmitted on at least one search space set. DCI format for UL cancellation or rescheduling grant can be referred to as DCI format x-y, where x can be 0 as chosen for UL grant in specifications, and y can be 0 or 1. Alternatively, x can be 2 if transmitted in a common DCI in a PDCCH as chosen for common PDCCH in the specifications and y=>1 can be integer, such as y can be 1 or 4. If y=1, it may imply DL pre-emption indication DCI format 2_1 can be reused for UL cancellation as well. Further, the size of the DCI format could be one of: (i) same as DCI format 0_0, (ii) same as DCI format 2_1 if the latter is configured in the same search space, and (iii) as configured by UE-specific RRC signaling.

In a first example, for a search space set s where UL_CI or rescheduling grant can be monitored, UE can be provided an indication by higher layer parameter dci-Formatx-y as part of SearchSpace higher layer configuration. If indication is present, UE can monitor of DCI format x-y in the search space set s.

In a second example, UE monitors the search space set s such as for DCI format x-y only after a trigger, such as following detection of a valid UL grant or starting from a specified number of symbols (Ns) preceding certain UL transmission opportunities, that could include one or more of: Types 1 or 2 CG PUSCH transmissions, SRS transmissions, PUCCH transmissions based on semi-static configurations (e.g., for Scheduling Request (SR), periodic or semi-persistent CSI feedback).

In an example, the monitoring pattern within a slot can be configured for the search space set s by higher layer parameter monitoringSymbolsWithinSlot. In addition, UE may also be provided with a higher layer parameter duration (or monitoring window) for search space set s, where duration can be indicated in slots or symbols. Note that this parameter duration may be same or separately configured from the duration parameter that can be optionally configured for a CSS in Rel-15 NR specifications. A monitoring offset can be to indicate where the duration starts. In one example, the search space set s may also be configured with a periodicity however the periodicity may not be used for monitoring UL_CI or rescheduling grant. In other words, UE may monitor for DCI format x-y in search space set s for only over a duration, not periodically. Alternatively, UE may monitor for DCI format x-y in search space set s according to the configured monitoring periodicity but within the time defined by the duration parameter.

In a third example, once a UE detects DCI format x-y in one of the monitoring occasions in search space s, UE skips monitoring for the remaining occasions within the slot. In another example, UE skips monitoring for the remaining occasions for search space set s within the duration.

In a fourth example, UE only monitors for search space set s based on a trigger, such as receiving an assignment from network. In one example, the intended search space set s may be indexed lower than other existing search space set indices, so that UE attempts search space set s with higher priority. This is because each search space set may have a given number of PDCCH candidates and UE may not exceed a total number of blind detection attempts within a slot over all the search space sets configured for UE. In one example, if search space set s is used in an on-demand basis, it may be identified as a higher priority search space set (irrespective of the search space set index), and if needed, one or more other search space sets can be dropped in a given slot. This could be realized by configuring additional flag/parameter to the search space set configuration. In another example, search space set s can also be used for monitoring other DCI formats as well with a periodicity, however, if a trigger is received, UE may monitor the search space set s in successive slots although it may have a periodicity that is larger than a slot. The parameter duration may only be used if a trigger is received, otherwise UE follows search space set s configuration with periodicity.

In one example, duration of the search space set configuration may only be active following receiving an assignment, such as grant. UE may still monitor the search space set s following a configured periodicity. In one example, search space set s has a periodicity of K=5 slots, duration is 2 slots. UL grant is received in DL slot n corresponding to an UL transmission that starts in UL slot n+K2, K2 indicates time between UL grant and UL data transmission, can be expressed in slots or symbols, e.g., K2=2 slot. In one example, offset to the start position of the duration may be obtained based on (minimum) UE processing time of NR PDCCH. A parameter N3 can be identified to define PDCCH processing time in slot(s) or symbol(s), for a given numerology. N3 can be smaller than N2, which is # of OFDM symbols required for UE to processing from the end of NR-PDCCH containing the UL grant to the earliest possible start of the corresponding NR PUSCH transmission from UE perspective. N3 can be UE capability parameter, and reported by the UE, e.g., as part of RRC connection setup. In one example, duration may start after an offset of one slot, i.e., from DL slot n+1 and end at slot n+2. UE may monitor search space set s according to a pattern as given by parameter monitoringSymbolsWithinSlot or a separately configured parameter within the slots n+1 and n+2. UE may resume monitoring for search space set s again in the next configured periodic occasion. However, the duration parameter may only be used following an assignment and not always. Note that, here, part of the search space set configuration is dynamically indicated/activated, which is different from fully-semi-static search space set configuration is current specifications.

In another example, the search space set s is not configured with duration. UE may implicitly obtain the duration for monitoring search space set s following the trigger. In one example, depending on the length of PUSCH transmission, UE may identify where the duration ends. In one example, UE may monitor the set s after an offset with periodicity of one slot according to the pattern given by parameter monitoringSymbolsWithinSlot and does not monitor after UL transmission ends.

In one example, number of blind decoding attempts and/or CCEs for channel estimation within a slot can be dynamically increased following a trigger. A search space set s can be used when following a trigger which may require larger number of blind decoding attempts and/or CCEs for channel estimation within a slot than the existing numbers of blind decoding attempts and/or CCEs for channel estimation before the trigger was received. UE may report in UE-NR-Capability if such behavior can be supported by the UE.

In one example, the UL grant in FIG. 2 can be replaced by DL grant, and UL data/PUSCH can instead be PUCCH. In other words, similar monitoring behaviors can also be used if UE is configured with the feature that part or all of a PUCCH transmission (including any repetitions) can be cancelled/dropped following an indication.

In one example, UE may not expect to monitor for cancellation indication to drop periodically configured UL transmissions, such as SRS or CSI feedback reporting in PUCCH.

In one example, a UE configured with Type 1 or Type 2 UL configured grant may also monitor for UL_CI or rescheduling grant or more generally UL grant according to above mentioned behaviors. The offset to start position of duration or start location of monitoring occasions can be counted from a reference point such as location in time preceding by a number of slots and/or symbols where UL transmission with configured grant starts, or preceding by a number of slots and/or symbols the boundary of the slot where a transmission opportunity starts. Alternatively, for Type 2 UL configured grant, offset to start position of duration or start location of monitoring occasions can be counted from the slot where DCI activating Type 2 UL configured transmission is received.

Which Transmissions May be Subject to Pre-Emption/Cancelation and/or Re-Scheduling Another aspect to be considered in the context of pre-emption/cancelation and re-scheduling, is whether it is possible to extend the applicability of such indications to other UL transmission, beyond dynamically scheduled PUSCH transmissions. Alternatively, it may need to be specified that only certain transmissions may be subject to PI/CI or re-scheduling.

Such details include, for example, in case of UL grant-free transmission, where the transmission opportunities are semi-statically configured, whether/how the gNB may cancel/re-schedule (some or all of) the PUSCH transmission opportunities, or whether or not PUCCH transmission opportunities (another example of semi-statistically configured transmission opportunities) may be subject to PI/CI/rescheduling indication.

In one example, in case of the configured grant UL transmission (where the duration of each transmission opportunity is known), some certain threshold may be defined, such that if a transmission duration is longer than the threshold, the UE needs to monitor for PI/CI/re-scheduling. Accordingly, if a transmission occupies a relatively long duration, the UE may rather need to cancel that transmission and start a higher priority transmission.

In one example, considering PUCCH transmissions, depending on the duration of the configured PUCCH (e.g., long PUCCH formats), the UE may need to monitor for any pre-emption/cancelation/re-scheduling indication.

Accordingly, short transmissions, e.g., when there is no repetition configured, SRS, or for short PUCCH formats, may not be subject to PI/CI/rescheduling indication. Whether a given PUCCH transmission can be canceled nor not may be identified by a higher layer parameter. The higher layer parameter can be obtained as part of one or more RRC configurations related to PUCCH transmission, such as PUCCH configuration of a given UE, common PUCCH configuration in a component carrier, PUCCH format configuration, PUCCH resource configuration corresponding to a given PUCCH resource ID.

Alternatively, it may be specified that only PUSCH transmission, including both dynamically scheduled as well as Types 1 and 2 CG PUSCH, may be subject to pre-emption/cancelation/re-scheduling. Alternatively, only dynamically scheduled PUSCH may be subject to PI/CI/rescheduling indication. These could be further extended by limiting the applicability of PI/CI/rescheduling indication to PUSCH transmissions with overall duration (including any repetitions) longer than 2 or 4 symbols. Similar rules as a function of the transmission duration may be applied to SRS as well as PUCCH transmissions.

In another example, re-scheduling can be performed for both grant-based and grant-free UL transmissions. As such, as long as the same HARQ PID are referred to, it may be possible for the UE to switch between these operations, and the GF UL transmission may be subject to the same rescheduling mechanism as mentioned earlier (while different scrambling RNTIs may be used for GB vs GF). Particularly, the re-scheduling grant may trigger the UE to switch between the GF and GB operations. It is noted that if the UE is not already transmitting any information, use of a re-scheduling grant may impose extra burden/overhead; hence, other forms of indication may be preferred.

In one example, when the UE receives the re-scheduling grant before it completes its current transmission in the GF operation, the GF PUSCH transmission opportunities can be overwritten by GB transmission opportunities.

UL Grant Prioritization

Unless otherwise mentioned, PUSCH can be based on dynamic grant or configured grant and can be canceled/dropped by UL_CI. UL_CI can be transmitted by a UE specific DCI such as UL grant or group common DCI format.

In one example, the UL cancelation indication can be applicable to both dynamic grant-based PUSCH or configured grant PUSCH, e.g., type 1 or type 2. Alternatively, higher layer configuration of configured grant PUSCH may include an identifier that PUSCH based on configured grant is prioritized even if cancelation indication indicates a resource that overlaps with PUSCH transmit occasion based on configured grant.

In one example, UL grant such as format 0_0 or format 0_1 includes an indication in a field, such as comprising 1 bit, whether the corresponding scheduled PUSCH can be preempted or canceled, if a subsequent cancelation indication is received and indicates a resource that overlaps with that of scheduled PUSCH. In other words, the indication identifies whether the transmission scheduled by the UL grant is prioritized or not, i.e., the transmission may not be dropped based on other control signaling. For example, bit value 0 may indicate the transmission is prioritized and may not be preempted/canceled by another L1 signaling such as UL grant or cancelation indication, or vice versa. In one example, if the UE identifies a first PUSCH is prioritized and/or may not be canceled by another L1 indication and/or if there is no other scheduled PUSCH that is not prioritized (i.e., either via indication in UL grant or higher layer configuration) exist within a configured or identified duration following the DCI that scheduled first PUSCH, UE does not monitor cancelation indication at least until/near the end of scheduled first PUSCH. In one example, the duration may start after UL scheduling DCI that scheduled first PUSCH and ends at end of first PUSCH+Ta, where Ta in one example can be the cancelation time based on cancelation indication, or N2 or higher layer configured minimum value of K2 (time offset between UL grant and PUSCH).

In one example, if monitoring is turned ON e.g., either via higher layer configuration or based on indication in a grant, UE may increase monitoring activity/budget. UE may only monitor the UL_CI over a configured or identified monitoring duration or period, e.g., following an UL grant or higher layer configuration. One or more of following options can be considered.

Activation of a search space (SS) set s, for higher layer configured duration, a duration of $T_{p,s}$, indicating a number of symbols/slots that the search space set s exists, for a configured monitoring duration and/or pattern, e.g., UE receives UL grant in symbol 0 in slot n, starts monitoring PI from symbol k>0 in slot n, every p>0 symbols, until symbol m=>0 of slot n+d, d>0. Start position of duration may be configured or implicitly obtained based on offset between UL grant and PUSCH. The SS Set is activated in an aperiodic manner, i.e., only monitored when UE is expecting a cancelation indication.

Alternatively, SS Set configuration of R15 can be used. UE only monitors the SS Set that is configured with the DCI format of cancelation indication or UL grant that can cancel a transmission during when the monitoring duration or period is active.

Alternatively, UE may prioritize the SSet(s) that is associated with the DCI format of UL_CI over other for a given budget of max number of PDCCH candidates monitored when the monitoring duration of UL_CI is active.

In one example, CBGTI field in a UL grant scheduling initial transmission may be used to indicate all transmission of that HARQ process indicated in the UL grant is protected/prioritized and may not be canceled or dropped.

In one example, activation of monitoring UL_CI can be implicitly obtained based on length of PUSCH. For example, if the scheduled or configured PUSCH duration/length is less than K symbols, UE expects that the transmission would not be canceled or dropped. For example, K={4, 7, 14} symbols for a given numerology.

In one example, a rescheduling DCI, e.g., an UL grant, such as fall back or non-fall back DCI(s) (including new DCI format if introduced) for UL scheduling may be used for UL cancelation, e.g., with NDI bit not toggled.

UE may drop one or more PUSCH occasions/repetitions after application/preparation time, e.g., Tproc,2 time (cf. 38.214) from end of PDCCH carrying rescheduling DCI, wherein the PUSCH transmission is identified by the HARQ PID used in the rescheduling DCI.

UE may drop a part of a PUSCH transmission if the application time corresponds to a middle of the PUSCH transmission.

UE may drop the first PUSCH occasion/repetition after application/preparation time, Tproc,2 time from end of PDCCH carrying rescheduling DCI.

UE may drop a part of the PUSCH transmission if the application time corresponds to a middle of the PUSCH transmission.

UE may still continue transmission of the remaining part of PUSCH transmission after cancelation or remaining PUSCH repetitions.

In one example, if the UL-SCH indicator bit=0, CSI request field=all zeros in the first UL grant such as format 0_1 is received for a first HARQ PID (PID indicated in grant), it may indicate cancelation of UL transmission associated with first HARQ PID. UL grant transmission with UL-SCH indicator bit=0, CSI request field=all zeros can be referred to as an empty grant, i.e., UL grant does not schedule any transmission. In one example, if a UL transmission of the first HARQ PID was scheduled before, the first UL grant may just cancel the previously scheduled UL transmission and not reschedule any transmission for the HARQ PID. UE may or may not flush the transmit buffer of the cancelled transmission for that HARQ PID. In one example, NDI bit is not toggled in the first UL grant as this is not new transport block for the HARQ PID. In another example, NDI bit may be a fixed value, or either toggle or not toggled, and UE may identify cancelation of a previously scheduled UL transmission for a given HARQ PID based on the bit values of fields UL-SCH indicator bit and CSI request, i.e., if the UL-SCH indicator bit=0, CSI request field=all zeros.

In one example, if a UE receives an UL grant with the UL-SCH indicator bit=0, CSI request field=all zeros, UE may assume the UL grant is a cancelation indication and UE may identify the time-frequency region for UL transmission cancelation based on the time domain resource assignment and frequency domain resource assignment fields. UE may cancel one or more UL transmissions, including one or more subsequent/ongoing scheduled or configured grant PUSCH, SRS, PUCCH transmissions that overlap with the indicated time-frequency region. In one example, UE ignores the HARQ PID in this case as cancelation can be applied to a group of UL transmission that overlaps with the indicated region.

In one example, if an UL grant is received for a given HARQ PID at least Tproc,2 time before a PUSCH or first PUSCH repetition transmit occasion of the CG PUSCH for that HARQ ID, UE may cancel the CG PUSCH transmission or first CG PUSCH repetition or all subsequent PUSCH repetitions and follow assignment in the UL grant. In one example, if the UL-SCH indicator bit=0, CSI request field=all zeros in the first UL grant such as format 0_1 is received for a first HARQ PID (PID indicated in grant), it may indicate cancelation of the CG PUSCH UL transmission or first PUSCH repetition or all subsequent PUSCH repetitions associated with first HARQ PID and UE would not retransmit the PUSCH or PUSCH repetition. In one example, UE only cancels the first PUSCH repetition (i.e., next PUSCH repetition after indication of cancelation) and still transmits the subsequent PUSCH repetitions.

In one example, a new UE specific DCI format can be used for UL_CI, which may be received with a new configured RNTI or C-RNTI. New DCI format can be size matched to fall back DCI format. The new DCI format may or may not be a scheduling DCI. If new DCI format can be a scheduling DCI, one example mentioned above where scheduling DCI is an empty grant and UE identifies time-frequency area to be canceled based on time and frequency resource indication can be applicable here.

New DCI format may have one or more of following configurable fields (this list is not exhaustive):

Header/flag if multiple DCI format have same size

A field to indicate which time/frequency region to be canceled/avoided containing XY≥1 bits, to indicate which area to cancel transmission. This may be a bitmap comprising X*Y bits, X indicates number of time partition and Y indicates number of frequency partitions within a configured region. The field may include a coarse indication, 1 bit: whether to drop remaining PUSCH/repetition occasions or only the impacted one. UE may identify the impacted one based on configured offset from the location of DCI or just identify the first PUSCH/repetition to be dropped after Tproc,2 time of DCI. The field may include CBG-level indication: which CBGs to be dropped or a typical time domain or frequency domain allocation in a grant.

HARQ ID or IDs

Carrier indicator

BWP indicator

Power control parameters, if UE needs to adjust transmit power in impacted area. This may be, for example, two bits: 00→cancel, 01/10/11→adjust power on overlapping transmission.

An indication whether to transmit UCI or not, if UCI originally chosen to be multiplexed onto the overlapping PUSCH. It may be possible UE could still transmit UCI on PUCCH although PUSCH needs to be dropped Zero Padding In one example, group-common DCI format can be considered for UL_CI, which may indicate one or more of the following:

A common field to indicate which time/frequency region to be canceled/avoided. In one example, the region contains XY bits, to indicate which area to cancel transmission. The indication may be bitmap comprising X*Y bits, X indicates number of time partition and Y indicates number of frequency partitions within a configured region. The configured region is referred to as the time-frequency resource addressed by the CI. The time/frequency indication granularity may be configured. Such as via higher layer RRC signaling. In one example, the field has a carrier specific common field, each comprising XY bits. Where X={1,2,3}, Y={1,2,3,4,5,6,7}. In one example the time domain granularity can be from 1 to 14 symbols, frequency domain granularity can be from ½, ¼, ⅛, 1/16 of active BW part. Here BW part refers to active UL BW part in a carrier. A reference configured region can be group of contiguous symbols, and group of contiguous PRBs. There may be multiple set of time-frequency granularity, such as two set, can be configured/supported in specification and one is identified via higher layer signaling for use when UL_CI is transmitted. Alternatively, one from a plurality of set of time-frequency granularity can be indicated dynamically in the DCI carrying UL_CI. UE specific fields with coarse indication. In one example the coarse indication includes 1 bit in each UE spec field, whether transmission to be canceled or not.

An offset to start position of the configured region in time, e.g., from the last symbol of PDCCH carrying CI if not configured by higher layer. The reference configured region would start after the offset, where the range in frequency of the region can be entire or part of the active UL BW part in a carrier. If the offset is not dynamically indicated, then a pre-configured offset is used which can be configured per component carrier or per BW part. The offset can be numerology dependent and can be obtained in number of slots or symbols.

In one example, UE monitors UL_CI in a GC DCI format, if UE is provided a higher layer parameter that enables monitoring, such as presence of a configuration ULpreemption or ULCancelation in PDCCH configuration. The configuration ULpreemption or ULCancelation may provide related higher layer parameters such as one or more of configured RNTI, time/frequency indication granularity, payload size of the DCI carrying UL_CI, configuration per serving cell in case the DCI provides UL CL over a group of cells, position in the DCI for configured serving cells, time/frequency region addressed by the cancelation indication etc.

In one example, if UL_CI is transmitted in a GC DCI, then UE only cancels the PUSCH or PUSCH repetitions overlapping with the indicated region and may still transmit the remaining PUSCH repetitions.

In one example, if a UE would multiplex UCI onto a PUSCH in a slot and UE receives UL_CI which indicates cancelation of PUSCH, UE may still transmit UCI in the original PUCCH resource if the PUCCH resource does not overlap with the indicated time/frequency region to be avoided by the UL_CI. This is assuming UE has the application time available to map UCI onto PUCCH where the UCI was originally intended for transmission with PUSCH by piggybacking. In one example, a higher layer parameter can be configured which identifies whether PUSCH carrying UCI can be canceled/dropped or not.

In one example, if PUCCH resource of a first UCI overlaps with first PUSCH and a second PUSCH in a slot and first PUSCH is located before second PUSCH, UE would multiplex UCI onto first PUSCH unless a UL_CI is received that cancels first PUSCH, then UE would multiplex UCI onto second PUSCH if does not overlap with the indicated region by UL_CI.

Figure 4:
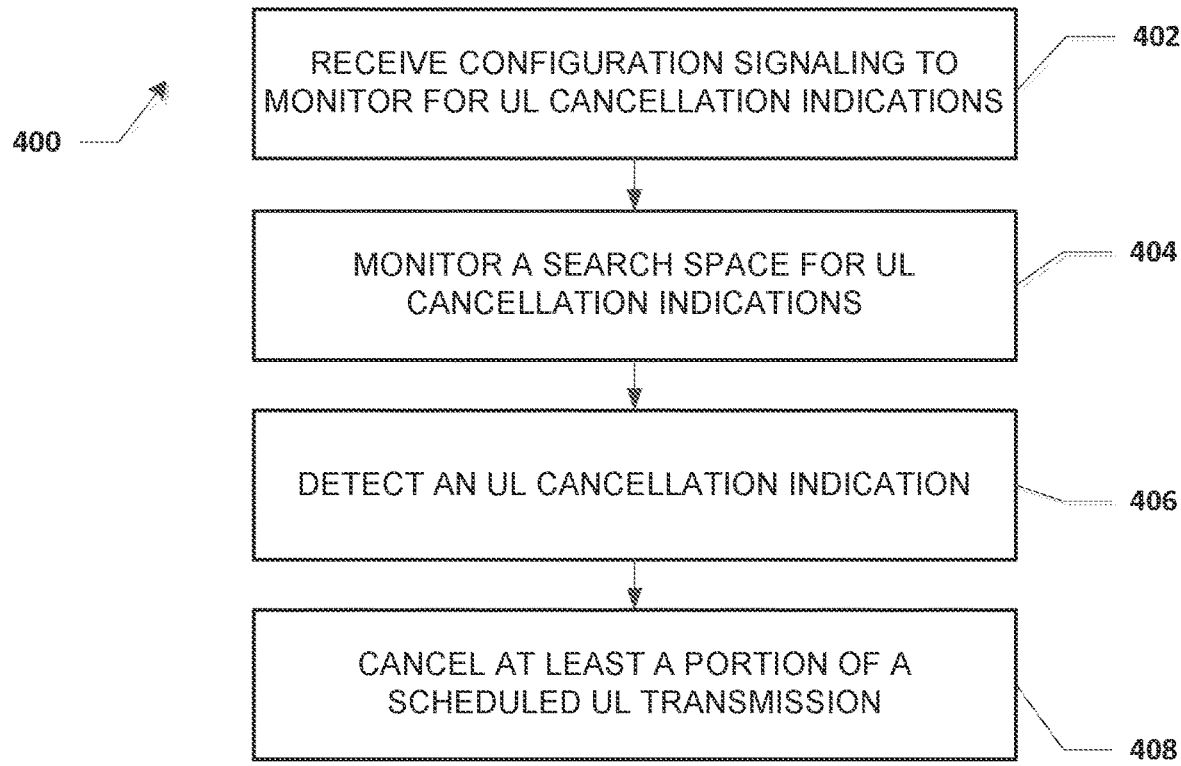
FIG. 4 illustrates a flow diagram of an exemplary method for cancelling an UL transmission in accordance with some examples.

FIG. 4 illustrates a flow diagram outlining a method that may be used to cancel scheduled UL transmissions. The method includes, at 402, receiving a configuration signaling to monitor for uplink (UL) cancellation indications. The method includes, at 404, monitoring a search space for UL cancellation indications. The method includes, at 406, detecting an UL cancellation indication in the search space. The method includes, at 408, cancelling at least a portion of a scheduled UL transmission in response to the UL cancellation indication.

Power Control for Overlapping Transmission

Network may use a given bandwidth part in a carrier for overlapping transmission of multiple service types. For example, 60 kHz bandwidth part may be used which may benefit low latency transmissions. In order to facilitate overlapping transmissions so that one or more of the overlapping transmissions are not adversely affected, a UE can be indicated of some parameters, such as power control parameter, should network expect subsequent overlapping transmissions. In other words, if overlapping transmissions are not expected, UE can operate with existing or according to other indicated power control parameters. Dynamic indication of power control parameters to one or more UEs when overlapping transmissions involve infrequent bursty traffic spanning small duration can be quite costly. To this end, UE may be indicated a power control parameter as part of BW part configuration or independent configuration or part of other UL associated configuration, which can be turned OFF by default. The parameter value can be turned ON when such overlapping transmission is expected. The parameter can be indicated by UE specific RRC signaling.

RNTI-Based Parameter Identification

A UE can be configured with one or more RNTIs where the RNTI(s) can be used to scramble the CRC appended to the DCI format. In one example, a UE is configured with RNTI A and RNTI B. One or more parameters related to UL transmission can be implicitly obtained from which RNTI is used. For example, a first set of power control parameters can be assumed if RNTI A is used, where as a second set of power control parameters can be assumed if RNTI B is used. For example, RNTI B can be used by the network with an UL grant when the grant provides resources in overlapping manner with other transmission, so that UE can use appropriate power in order to control UL interference at the gNB and consequently affecting one or more overlapping transmission.

Figure 5:
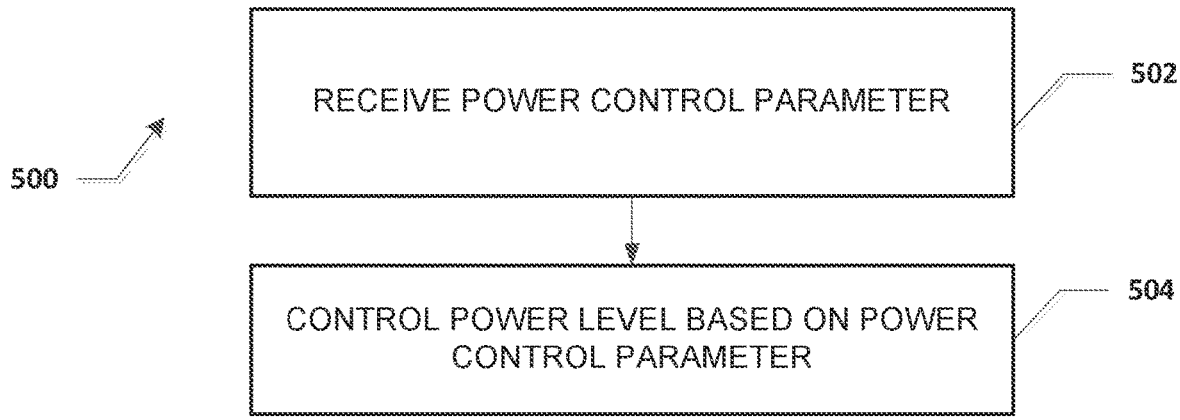
FIG. 5 illustrates a flow diagram of an exemplary method for controlling the power of an UL transmission in accordance with some examples.

FIG. 5 illustrates a flow diagram outlining a method that may be used to control power for transmission. The method includes, at 502, receiving a power control signaling that specifies a power control parameter value. The method includes, at 504, controlling a power level of subsequent transmission based on the value.

For one or more examples, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section

EXAMPLES

Example 1 is one or more computer-readable media having instructions that, when executed, cause a user equipment (UE) device to: receive a configuration signaling to monitor for uplink (UL) cancellation indications; monitor a search space for an UL cancellation indication; detect an UL cancellation indication in the search space; and in response, cancel at least a portion of a scheduled UL transmission.

Example 2 includes the subject matter of example 1, including or omitting optional elements, wherein the instructions further include instructions, that when executed, cause the UE to monitor for UL cancellation indications in a UE specific search space associated with a Control Resource Set (CORESET).

Example 3 includes the subject matter of example 1, including or omitting optional elements, wherein the instructions further include instructions, that when executed, cause the UE to cancel a scheduled Physical Uplink Shared Channel (PUSCH) transmission scheduled by an UL grant in response to detecting a cancellation indication.

Example 4 includes the subject matter of example 1, including or omitting optional elements, wherein the instructions further include instructions, that when executed, cause the UE to monitor for UL cancellation indications in a group-common search space associated with a Control Resource Set (CORESET).

Example 5 includes the subject matter of example 1, including or omitting optional elements, wherein the instructions further include instructions, that when executed, cause the UE to cancel a configured UL transmission not associated with an UL grant in response to detecting a cancellation indication.

Example 6 includes the subject matter of example 1, including or omitting optional elements, wherein the instructions further include instructions, that when executed, cause the UE to cancel an entirety of a scheduled UL transmission.

Example 7 includes the subject matter of example 1, including or omitting optional elements, wherein the instructions further include instructions, that when executed, cause the UE to: determine that the cancellation indication specifies a portion of a scheduled UL transmission to cancel; and in response, cancel the specified portion of the scheduled UL transmission.

Example 8 includes the subject matter of example 1, including or omitting optional elements, wherein the instructions further include instructions, that when executed, cause the UE to: determine physical resources specified in the UL cancellation indication; and cancel all scheduled UL transmissions that overlap with the specified physical resources.

Example 9 includes the subject matter of example 1, including or omitting optional elements, wherein the instructions further include instructions, that when executed, cause the UE to: detect that a trigger condition has been met; and in response, commence monitoring of the search space for cancellation indications.

Example 10 includes the subject matter of example 9, including or omitting optional elements, wherein the instructions further include instructions, that when executed, cause the UE to detect that the trigger condition has been met when an UL grant for scheduling a PUSCH transmission is received.

Example 11 includes the subject matter of example 1, including or omitting optional elements, wherein the instructions further include instructions, that when executed, cause the UE to: receive a second UL grant for a transport block (TB) associated with a scheduled UL transmission resulting from a first UL grant; and in response, cancel the scheduled UL transmission.

Example 12 includes the subject matter of example 11, including or omitting optional elements, wherein the instructions further include instructions, that when executed, cause the UE to transmit the TB according to the second UL grant.

Example 13 includes the subject matter of example 11, including or omitting optional elements, wherein the instructions further include instructions, that when executed, cause the UE to determine that the second UL grant and the first UL grant have a same hybrid automatic repeat request (HARQ) process identifier associated with the TB, and in response, cancel the scheduled UL transmission.

Example 14 includes the subject matter of example 1, including or omitting optional elements, wherein the instructions further include instructions, that when executed, cause the UE to receive the configuration signaling via higher layer radio resource control (RRC) signaling.

Example 15 includes the subject matter of example 1, including or omitting optional elements, wherein the instructions further include instructions, that when executed, cause the UE to determine a monitoring duration and monitoring pattern for the search space based on higher layer signaling.

Example 16 includes the subject matter of example 1, including or omitting optional elements, wherein the instructions further include instructions, that when executed, cause the UE to determine a length of the scheduled UL transmission; and refrain from monitoring the search space when the length falls below a threshold.

Example 17 includes the subject matter of example 1, including or omitting optional elements, wherein the instructions further include instructions, that when executed, cause the UE to: determine physical resources specified by the UL cancellation indication; and transmit a portion of the scheduled UL transmission that does not overlap with the specified physical resources.

Example 18 includes the subject matter of example 1, including or omitting optional elements, wherein the instructions further include instructions, that when executed, cause the UE to receive an UL grant; schedule the UL transmission based on the UL grant; determine, based on the UL grant, that the UL grant is prioritized; and receiving the cancellation indication for the scheduled UL transmission; and transmitting the scheduled UL transmission.

Example 19 includes the subject matter of example 18, including or omitting optional elements, wherein the instructions further include instructions, that when executed, cause the UE to, in response to receiving the cancellation indication, cancel a subsequent scheduled repeat UL transmission that resulted from the UL grant.

Example 20 includes the subject matter of example 18, including or omitting optional elements, wherein the instructions further include instructions, that when executed, cause the UE to determine that the UL grant is prioritized based on a value of a DCI field of the UL grant.

Example 21 is one or more computer-readable media having instructions that, when executed, cause a user equipment (UE) device to receive a power control signaling that specifies a power control parameter value; and in response, control a power level of subsequent transmission based on the value.

Example 22 includes the subject matter of example 21, including or omitting optional elements, wherein the instructions further include instructions, that when executed, cause the UE to: store the power control parameter; and in response to receiving an activation indication from higher layer signaling, control the power level of subsequent transmission based on the value.

Example 23 includes the subject matter of example 21, including or omitting optional elements, wherein the instructions further include instructions, that when executed, cause the UE to: determine a plurality of power control parameters mapped to a respective radio network temporary identifiers (RNTIs); store the power control parameters; and control the power level of subsequent transmission based on a present RNTI for the UE device.

Any of the above described examples may be combined with any other example (or combination of examples), unless explicitly stated otherwise. The foregoing description of one or more implementations provides illustration and description, but is not intended to be exhaustive or to limit the scope of examples to the precise form disclosed. Modifications and variations are possible in light of the above teachings or may be acquired from practice of various examples.

We claim:

1. Baseband circuitry, configured to:
receive a configuration signaling to monitor for uplink (UL) cancellation indications;
monitor, based on the configuration signaling, a search space for an UL cancellation indication;
detect an UL cancellation indication in the search space, wherein the UL cancellation indication identifies physical resources that span beyond a scheduled physical uplink shared channel (PUSCH) transmission; and
in response, cancel UL transmissions that overlap with the physical resources identified by the UL cancellation indication including at least a portion of the scheduled PUSCH transmission.

2. The baseband circuitry of claim 1, wherein the scheduled PUSCH transmission is associated with a Type 1 or Type 2 configured grant.

3. The baseband circuitry of claim 1, wherein the UL cancellation indication comprises an X by Y bitmap of physical resources, wherein X is greater than one and corresponds to a number of time partitions and Y is greater than one and corresponds to a number of frequency partitions.

4. The baseband circuitry of claim 1, further configured to monitor for UL cancellation indications in a group-common search space associated with a Control Resource Set (CORESET).

5. The baseband circuitry of claim 1, further configured to:
cancel a portion of the scheduled PUSCH transmission specified by the UL cancellation indication.

6. The baseband circuitry of claim 1, further configured to:
cancel all scheduled UL transmissions that overlap with physical resources specified by the UL cancellation indication.

7. The baseband circuitry of claim 1, further configured to:
detect that a trigger condition has been met; and
in response, commence monitoring of the search space for cancellation indications.

8. The baseband circuitry of claim 7, further configured to detect that the trigger condition has been met when an UL grant for scheduling a PUSCH transmission is received.

9. The baseband circuitry of claim 1, further configured to:
receive a second UL grant for a transport block (TB) associated with a scheduled UL transmission resulting from a first UL grant; and
in response, cancel the scheduled UL transmission.

10. The baseband circuitry of claim 9, further configured to cause transmission of the TB according to the second UL grant.

11. The baseband circuitry of claim 9 further configured to determine that the second UL grant and the first UL grant have a same hybrid automatic repeat request (HARQ) process identifier associated with the TB, and in response, cancel the scheduled UL transmission.

12. The baseband circuitry of claim 1, further configured to:
determine a length of the scheduled PUSCH transmission; and
refrain from monitoring the search space when the length falls below a threshold.

13. The baseband circuitry of claim 1, further configured to:
    transmit a portion of the scheduled PUSCH transmission that does not overlap with physical resources specified by the UL cancellation indication.

14. The baseband circuitry of claim 1, further configured to:
    receive an UL grant;
    schedule the PUSCH transmission based on the UL grant;
    determine, based on the UL grant, that the UL grant is prioritized; and
    receiving the UL cancellation indication for the scheduled PUSCH transmission; and
    cause transmission of the scheduled PUSCH transmission.

15. The baseband circuitry of claim 14, further configured to, in response to receiving the UL cancellation indication, cancel a subsequent scheduled repeat UL transmission that resulted from the UL grant.

16. The baseband circuitry of claim 14, further configured to determine that the UL grant is prioritized based on a value of a DCI field of the UL grant.

17. A user equipment, comprising a memory and a baseband processor configured to, when executing instructions stored in the memory, cause the UE to receive a configuration signaling to monitor for uplink (UL) cancellation indications;
    monitor, based on the configuration signaling, a search space for an UL cancellation indication;
    detect an UL cancellation indication in the search space, wherein the UL cancellation indication identifies physical resources that span beyond a scheduled physical uplink shared channel (PUSCH) transmission; and
    in response, cancel UL transmissions that overlap with the physical resources identified by the UL cancellation indication including at least a portion of the scheduled PUSCH transmission.

18. The UE of claim 17, wherein the UL cancellation indication comprises an X by Y bitmap of physical resources, wherein X is greater than one and corresponds to a number of time partitions and Y is greater than one and corresponds to a number of frequency partitions.

19. A method, comprising:
    receiving a configuration signaling to monitor for uplink (UL) cancellation indications;
    monitoring, based on the configuration signaling, a search space for an UL cancellation indication;
    detecting an UL cancellation indication in the search space, wherein the UL cancellation indication identifies physical resources that span beyond a scheduled physical uplink shared channel (PUSCH) transmission; and
    in response, canceling UL transmissions that overlap with the physical resources identified by the UL cancellation indication including at least a portion of the scheduled PUSCH transmission.

20. The method of claim 19, wherein the UL cancellation indication comprises an X by Y bitmap of physical resources, wherein X is greater than one and corresponds to a number of time partitions and Y is greater than one and corresponds to a number of frequency partitions.

\* \* \* \* \*